(12) United States Patent
Ugale et al.

(10) Patent No.: US 10,481,813 B1
(45) Date of Patent: Nov. 19, 2019

(54) DEVICE AND METHOD FOR EXTENDING CACHE OPERATIONAL LIFETIME

(71) Applicant: EMC IP Holding Company LLC, Hopkinton, MA (US)

(72) Inventors: Rahul B. Ugale, Santa Clara, CA (US); Satish Kumar Kashi Visvanathan, San Jose, CA (US); Mahesh Kamat, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/663,385

(22) Filed: Jul. 28, 2017

(51) Int. Cl.
*G06F 3/06* (2006.01)
*G06F 12/0875* (2016.01)

(52) U.S. Cl.
CPC ............ *G06F 3/0626* (2013.01); *G06F 3/067* (2013.01); *G06F 3/0644* (2013.01); *G06F 3/0655* (2013.01); *G06F 12/0875* (2013.01); *G06F 2212/452* (2013.01)

(58) Field of Classification Search
None
See application file for complete search history.

(56) References Cited

U.S. PATENT DOCUMENTS

| 7,085,911 | B2 * | 8/2006 | Sachedina | G06F 12/0806 711/201 |
|---|---|---|---|---|
| 7,818,515 | B1 | 10/2010 | Umbehocker et al. | |
| 8,190,835 | B1 | 5/2012 | Yueh | |
| 8,396,841 | B1 | 3/2013 | Janakiraman | |
| 8,732,403 | B1 | 5/2014 | Nayak | |
| 8,782,323 | B2 | 7/2014 | Glikson et al. | |
| 8,898,114 | B1 | 11/2014 | Feathergill et al. | |
| 8,898,120 | B1 | 11/2014 | Efstathopoulos | |
| 8,904,120 | B1 | 12/2014 | Killammsetti et al. | |
| 8,918,390 | B1 | 12/2014 | Shilane et al. | |
| 8,943,032 | B1 | 1/2015 | Xu et al. | |
| 8,949,208 | B1 | 2/2015 | Xu et al. | |
| 9,183,200 | B1 | 11/2015 | Liu et al. | |
| 9,244,623 | B1 | 1/2016 | Bent et al. | |

(Continued)

FOREIGN PATENT DOCUMENTS

| EP | 2738665 A1 | 6/2014 |
|---|---|---|
| WO | 2013056220 A1 | 4/2013 |

(Continued)

OTHER PUBLICATIONS

International Search Report and Written Opinion issued in corresponding WO application No. PCT/US2018/027642, dated Jun. 7, 2018 (15 pages).

(Continued)

*Primary Examiner* — Gary W. Cygiel
(74) *Attorney, Agent, or Firm* — Chamberlain, Hrdlicka, White, Williams, & Aughtry

(57) ABSTRACT

A data storage device includes a cache for a data storage and a processor. The data storage includes an object storage. The processor obtains cache hardware heuristics data for a first time period; makes a first determination that the cache hardware heuristics data for the first time period does not meet a goal associated with the first time period; and populates the cache using a reduced size index cache in response to the first determination during a second time period.

11 Claims, 17 Drawing Sheets

(56) References Cited

U.S. PATENT DOCUMENTS

| | | |
|---|---|---|
| 9,250,823 B1 | 2/2016 | Kamat et al. |
| 9,251,160 B1 | 2/2016 | Wartnick |
| 9,280,550 B1 | 3/2016 | Hsu et al. |
| 9,298,724 B1 | 3/2016 | Patil et al. |
| 9,317,218 B1 | 4/2016 | Botelho et al. |
| 9,336,143 B1 | 5/2016 | Wallace et al. |
| 9,390,116 B1* | 7/2016 | Li .................. G06F 16/2272 |
| 9,390,281 B2 | 7/2016 | Whaley et al. |
| 9,442,671 B1 | 9/2016 | Zhang et al. |
| 9,830,111 B1 | 11/2017 | Patiejunas et al. |
| 10,002,048 B2 | 6/2018 | Chennamsetty et al. |
| 10,031,672 B2 | 7/2018 | Wang et al. |
| 10,102,150 B1 | 10/2018 | Visvanathan et al. |
| 10,175,894 B1 | 1/2019 | Visvanathan et al. |
| 2003/0110263 A1 | 6/2003 | Shillo |
| 2005/0120058 A1 | 6/2005 | Nishio |
| 2005/0160225 A1* | 7/2005 | Presler-Marshall .................. G06F 12/0897 711/119 |
| 2005/0182906 A1 | 8/2005 | Chatterjee et al. |
| 2006/0075191 A1 | 4/2006 | Lolayekar et al. |
| 2008/0082727 A1 | 4/2008 | Wang |
| 2008/0133446 A1 | 6/2008 | Dubnicki et al. |
| 2008/0133561 A1 | 6/2008 | Dubnicki et al. |
| 2008/0216086 A1 | 9/2008 | Tanaka et al. |
| 2008/0244204 A1* | 10/2008 | Cremelie ............ G06F 11/2097 711/162 |
| 2009/0235115 A1 | 9/2009 | Butlin |
| 2009/0271454 A1 | 10/2009 | Anglin et al. |
| 2010/0049735 A1 | 2/2010 | Hsu |
| 2010/0094817 A1 | 4/2010 | Ben-Shaul et al. |
| 2010/0250858 A1 | 9/2010 | Cremelie et al. |
| 2011/0055471 A1 | 3/2011 | Thatcher et al. |
| 2011/0099351 A1 | 4/2011 | Condict |
| 2011/0161557 A1 | 6/2011 | Haines et al. |
| 2011/0185149 A1 | 7/2011 | Gruhl et al. |
| 2011/0196869 A1 | 8/2011 | Patterson et al. |
| 2011/0231594 A1 | 9/2011 | Sugimoto et al. |
| 2012/0158670 A1 | 6/2012 | Sharma et al. |
| 2012/0278511 A1 | 11/2012 | Alatorre et al. |
| 2013/0060739 A1 | 3/2013 | Kalach et al. |
| 2013/0111262 A1 | 5/2013 | Taylor et al. |
| 2013/0138620 A1 | 5/2013 | Yakushev et al. |
| 2014/0012822 A1 | 1/2014 | Sachedina et al. |
| 2014/0258248 A1 | 9/2014 | Lambright et al. |
| 2014/0258824 A1 | 9/2014 | Khosla et al. |
| 2014/0281215 A1 | 9/2014 | Chen et al. |
| 2014/0310476 A1 | 10/2014 | Kruus |
| 2015/0106345 A1 | 4/2015 | Trimble et al. |
| 2015/0331622 A1 | 11/2015 | Chiu et al. |
| 2016/0026652 A1 | 1/2016 | Zheng |
| 2016/0112475 A1 | 4/2016 | Lawson et al. |
| 2016/0188589 A1 | 6/2016 | Guilford et al. |
| 2016/0224274 A1 | 8/2016 | Kato |
| 2016/0239222 A1 | 8/2016 | Shetty et al. |
| 2016/0323367 A1 | 11/2016 | Murtha et al. |
| 2016/0342338 A1 | 11/2016 | Wang |
| 2017/0093961 A1 | 3/2017 | Pacella et al. |
| 2017/0220281 A1 | 8/2017 | Gupta et al. |
| 2017/0300424 A1 | 10/2017 | Beaverson et al. |
| 2017/0359411 A1 | 12/2017 | Burns et al. |
| 2018/0089037 A1 | 3/2018 | Liu et al. |
| 2018/0146068 A1 | 5/2018 | Johnston et al. |
| 2018/0322062 A1 | 11/2018 | Watkins et al. |

FOREIGN PATENT DOCUMENTS

| | | |
|---|---|---|
| WO | 2013115822 A1 | 8/2013 |
| WO | 2014185918 A1 | 11/2014 |

OTHER PUBLICATIONS

Deepavali Bhagwat et al.; "Extreme Binning: Scalable, Parallel Deduplication for Chunk-based File Backup"; IEEE Mascots; Sep. 2009 (10 pages).

Mark Lillibridge et al.; "Sparse Indexing: Large Scale, Inline Deduplication Using Sampling and Locality"; 7th USENIX Conference on File and Storage Technologies, USENIX Association; pp. 111-123; 2009 (13 pages).

International Search Report and Written Opinion issued in corresponding PCT Application PCT/US2018/027646, dated Jul. 27, 2018. (30 pages).

Extended European Search Report issued in corresponding European Application No. 18184842.5, dated Sep. 19, 2018.

Jaehong Min et al.; "Efficient Deduplication Techniques for Modern Backup Operation"; IEEE Transactions on Computers; vol. 60, No. 6; pp. 824-840; Jun. 2011.

Daehee Kim et al.; "Existing Deduplication Techniques"; Data Depublication for Data Optimization for Storage and Network Systems; Springer International Publishing; DOI: 10.1007/978-3-319-42280-0_2; pp. 23-76; Sep. 2016.

Extended European Search Report issued in corresponding European Application No. 18185076.9, dated Dec. 7, 2018 (9 pages).

Lei Xu et al.; "SHHC: A Scalable Hybrid Hash Cluster for Cloud Backup Services in Data Center"; 2011 31st International Conference on Distributed Computing Systems Workshops (ICDCSW); IEEE Computer Society; pp. 61-65; 2011 (5 pages).

* cited by examiner

| Window Period | Does cache hardware heuristics meet goal? |
|---|---|
| $T_0$-$T_1$ | YES |
| $T_0$-$T_2$ | YES |
| $T_1$-$T_3$ | NO |
| $T_2$-$T_4$ | NO |
| $T_3$-$T_5$ | NO |
| $T_4$-$T_6$ | NO |
| $T_5$-$T_7$ | NO |
| $T_6$-$T_8$ | YES |
| $T_7$-$T_9$ | YES |
| $T_8$-$T_{10}$ | YES |

DEVICE AND METHOD FOR EXTENDING CACHE OPERATIONAL LIFETIME

BACKGROUND

Computing devices generate, use, and store data. The data may be, for example, images, document, webpages, or meta-data associated with any of the files. The data may be stored locally on a persistent storage of a computing device and/or may be stored remotely on a persistent storage of another computing device.

SUMMARY

In one aspect, a data storage device in accordance with one or more embodiments of the invention includes a cache for a data storage and a processor. The data storage includes an object storage. The processor obtains cache hardware heuristics data for a first time period; makes a first determination that the cache hardware heuristics data for the first time period does not meet a goal associated with the first time period; and populates the cache using a reduced size index cache in response to the first determination during a second time period.

In one aspect, a method of operating a data storage device in accordance with one or more embodiments of the invention includes obtaining, by the data storage device, cache hardware heuristics data for a first time period. The cache hardware heuristics data is associated with a cache for an object storage. The method also includes making, by the data storage device, a first determination that the cache hardware heuristics data for the first time period does not meet a goal associated with the first time period and populating, by the data storage device, the cache using a reduced size index cache during a second time period in response to the first determination.

In one aspect, a non-transitory computer readable medium in accordance with one or more embodiments of the invention includes computer readable program code, which when executed by a computer processor enables the computer processor to perform a method for operating a data storage device, the method includes obtaining, by the data storage device, cache hardware heuristics data for a first time period. The cache hardware heuristics data is associated with a cache for an object storage. The method also includes making, by the data storage device, a first determination that the cache hardware heuristics data for the first time period does not meet a goal associated with the first time period and populating, by the data storage device, the cache using a reduced size index cache during a second time period in response to the first determination.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 8K shows a first diagram of an explanatory example.

DETAILED DESCRIPTION

Figure 1A:
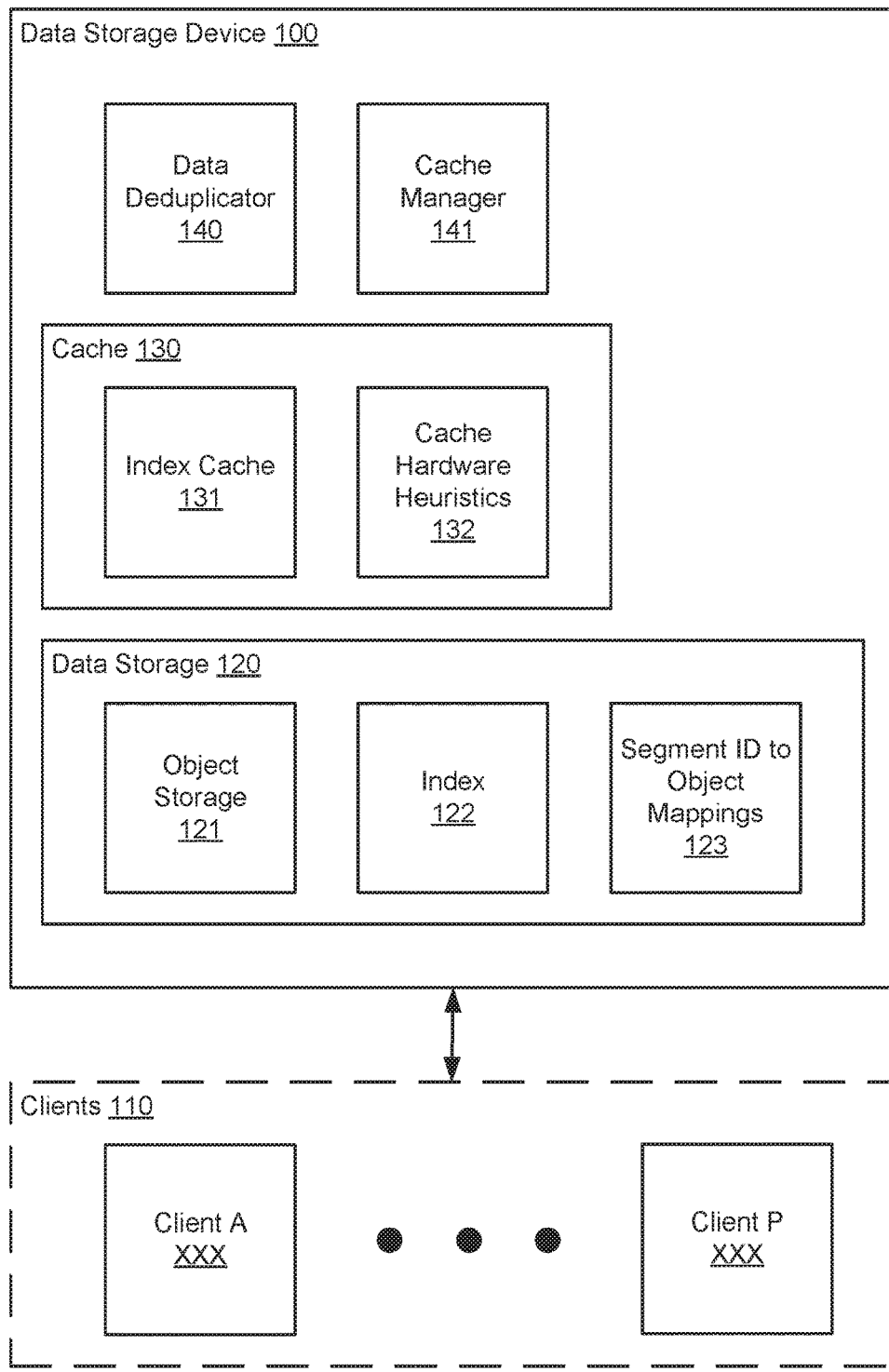
FIG. 1A shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for storing data. More specifically, the systems, devices, and methods may reduce the amount of storage required to store data.

In one or more embodiments of the invention, a data storage device may deduplicate data before storing the data in a data storage. The data storage device may deduplicate the data against data already stored in the data storage before storing the deduplicated data in the data storage.

For example, when multiple versions of a large text document having only minimal differences between each of the versions are stored in the data storage, storing each version will require approximately the same amount of storage space if not deduplicated. In contrast, when the multiple versions of the large text document are deduplicated before storage, only the first version of the multiple versions stored will require a substantial amount of storage. Segments that are unique to both versions of the word document will be retained in the storage while duplicate segments included in subsequently stored version of the large text document will not be stored.

To deduplicate data, a file of the data may be broken down into segments. Fingerprints of the segments of the file may be generated. As used herein, a fingerprint may be a bit sequence that virtually uniquely identifies a segment. As used herein, virtually uniquely means that the probability of collision between each fingerprint of two segments that include different data is negligible, compared to the probability of other unavoidable causes of fatal errors. In one or more embodiments of the invention, the probability is $10^{-20}$ or less. In one or more embodiments of the invention, the unavoidable fatal error may be caused by a force of nature such as, for example, a tornado. In other words, the fingerprint of any two segments that specify different data will virtually always be different.

In one or more embodiments of the invention, the fingerprints of the segments are generated using Rabin's fingerprinting algorithm. In one or more embodiments of the invention, the fingerprints of the unprocessed file segment are generated using a cryptographic hash function. The cryptographic hash function may be, for example, a message digest (MD) algorithm or a secure hash algorithm (SHA). The message MD algorithm may be MD5. The SHA may be SHA-0, SHA-1, SHA-2, or SHA3. Other fingerprinting algorithms may be used without departing from the invention.

To determine whether any of the segments of the file are duplicates of segments already stored in the data storage, the fingerprints of the segments of the file may be compared to the fingerprints of segments already stored in the data storage. Any segments of the file having fingerprints that match fingerprints of segments already stored in the data storage may be marked as duplicate and not stored in the data storage. Not storing the duplicate segments in the data storage may reduce the quantity of storage required to store the file when compared to the quantity of storage space required to store the file without deduplicating the segments of the files.

In one or more embodiments of the invention, the data storage device may include a cache that mirrors all of the fingerprints, or a portion thereof, in the data storage. The cache maybe hosted by one or more physical storage devices that are higher performance than the physical stored devices hosting the data storage. In one or more embodiments of the invention, the cache may be hosted by solid state drives and the data storage may be hosted by one or more hard disk drives.

In one or more embodiments of the invention, the data storage device may update the cache based on changes to the data stored in the data storage. The data storage device may control the rate and content of the updates to the cache to meet one or more cache hardware heuristics. The cache hardware heuristics may specify, for example, a goal of writing a predetermined amount of data, or less, to the cache. The goal may be based on a limitation of the physical storage devices hosting the cache. For example, some types of solid state drives have a limited number of write cycles before the drive, or a portion thereof, becomes inoperable. Controlling the rate and content of the updates to the cache to meet the one or more cache hardware heuristics goal may extend the life of the physical storage devices hosting the cache to predetermined goal.

FIG. 1A shows a system in accordance with one or more embodiments of the invention. The system may include clients (110) that store data in the data storage device (100).

The clients (110) may be computing devices. The computing devices may be, for example, mobile phones, tablet computers, laptop computers, desktop computers, or servers. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application. The clients (110) may be other types of computing devices without departing from the invention. The clients (110) may be operably connected to the data storage device (100) via a network.

The clients (110) may store data in the data storage device (100). The data may be of any time or quantity. The clients (110) may store the data in the data storage device (100) by sending data storage requests to the data storage device (100) via an operable connection. The data storage request may specify one or more names that identify the data to-be-stored by the data storage device (100) and include the data. The names that identify the data to-be-stored may be later used by the clients (110) to retrieve the data from the data storage device (100) by sending data access requests including the identifiers included in the data storage request that caused the data to be stored in the data storage device (100).

The data storage device (100) may be a computing device. The computing device may be, for example, a mobile phone, a tablet computer, a laptop computer, a desktop computer, a server, or a cloud resource. As used herein, a cloud resource means a logical computing resource that utilizes the physical computing resources of multiple computing devices, e.g., a cloud service. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application and illustrated in at least FIGS. 3-7. The data storage device (100) may be other types of computing devices without departing from the invention.

The data storage device (100) may store data sent to the data storage device (100) from the clients (110) and provide data stored in the data storage device (100) to the clients (110). The data storage device (100) may include a data storage (120) that stores the data from the clients, a cache (130), a data deduplicator (140), and a cache manager (150). Each component of the data storage device (100) is discussed below.

The data storage device (100) may include a data storage (120). The data storage (120) may be hosted by a persistent storage that includes physical storage devices. The physical storage devices may be, for example, hard disk drives, solid state drives, hybrid disk drives, tape drives that support random access, or any other type of persistent storage media. The data storage (120) may include any number and/or combination of physical storage devices.

The data storage (120) may include an object storage (121) for storing data from the clients (110). As used herein, an object storage is a data storage architecture that manages data as objects. Each object may include a number of bytes for storing data in the object. In one or more embodiments of the invention, the object storage does not include a file system. Rather, a namespace (not shown) may be used to organize the data stored in the object storage. The namespace may associate names of files stored in the object storage with identifiers of segments of files stored in the object storage. The namespace may be stored in the data storage. For additional details regarding the object storage (121), see FIGS. 1D-1E.

The object storage (121) may be a partially deduplicated storage. As used herein, a partially deduplicated storage refers to a storage that attempts to reduce the required amount of storage space to store data by not storing multiple copies of the same files or bit patterns. A partially deduplicates storage attempts to balance the input-output (IO) limits of the physical devices on which the object storage is stored by only comparing the to-be-stored data to a portion of all of the data stored in the object storage.

To partially deduplicate data, the to-be-stored data may be broken down into segments. The segments may correspond to portions of the to-be-stored data. Fingerprints that identify each segment of the to-be-stored data may be generated. The generated fingerprints may be compared to the fingerprints of a portion of the segments stored in the object storage. In other words, the fingerprints of the to-be-stored data may only be deduplicated against the fingerprints of a portion of the segments in the object storage and is not deduplicated against the fingerprints of all of the segments in the object storage. Any segments of the to-be-stored data that do not match a fingerprint of the portion of the segments stored in the object storage may be stored in the object storage, the other segments may not be stored in the object storage. A recipe to generate the now-stored data may be generated and stored in the data storage so that the now-stored data may be retrieved from the object storage. The recipe may enable all of the segments required to generate the now-stored data to be retrieved from the object storage. Retrieving the aforementioned segments may enable the file to be regenerated. The retrieved segments may include segments that were generated when segmenting the data and segments that were generated when segmenting other data that was stored in the object storage prior to storing the now-stored segments.

In one or more embodiments of the invention, the namespace may be a data structure stored on physical storage devices of the data storage (120) that organizes the data storage resources of the physical storage devices. In one or more embodiments of the invention, the namespace may associate a file with a file recipe stored in the object storage. The file recipe may be used to generate the file based using segments stored in the object storage.

The data storage device (100) may include an index (122). The index may be a data structure that includes fingerprints of each segment stored in the object storage and associates each of the fingerprints with an identifier of a segment from which the respective fingerprint was generated. For additional details regarding the index (122), See FIG. 1B.

The data storage device (100) may include segment identifiers (ID) to object mappings (123). The mappings may associate an ID of a segment with an object of the object storage that includes the segment identified by the segment ID. The aforementioned mappings may be used to retrieve segments from the object storage.

More specifically, when a data access request is received, it may include a file name. The file name may be used to query the namespace to identify a file recipe. The file recipe may be used to identify the identifiers of segments required to generated the file identified by the file name. The segment ID to object mappings may enable object of the object storage the include the segment identified by the segment IDs of the file recipe to be identified. As will be discussed below, each object of the object may be self-describing and, thereby, enable the segments to be retrieved from the objects once the objects that include the segments are identified. For additional details regarding the segment identifiers ID to object mappings (123), See FIGS. 1F and 1G.

As discussed above, the data storage device (100) may include a cache (130). The cache (130) may be hosted by a persistent storage that includes physical storage devices. The physical storage devices may be, for example, hard disk drives, solid state drives, hybrid disk drives, or any other type of persistent storage media. The physical storage devices of the cache (130) may be have better performance characteristics than the physical storage devices of the data storage (120). For example, the physical storage devices of the cache may support higher 10 rates than the physical storage devices off the data storage. In one or more embodiments of the invention, the physical storage devices hosting the cache may be a number of solid state drives and the physical storage hosting the data storage may be hard disk drives. The cache (130) may include any number and/or combination of physical storage devices.

The cache (130) may include an index cache (131). The index cache (131) may be a cache for the fingerprints of the index. More specifically, the index cache (131) maybe a data structure that includes a portion of the fingerprints of the index (122). When deduplicating data, the data storage device may first attempt to retrieve fingerprints from the index cache (131). If the fingerprints are not in the cache, the data storage device may retrieve the fingerprints from the index (122).

In one or more embodiments of the invention, the index cache (131) mirrors all of the fingerprints of the index (122) when the cache hardware heuristics (132) are meeting a predetermined goal. When the cache hardware heuristics (132) are not meeting a predetermined goal, the index cache (131) only mirrors a portion of the fingerprints in the index. As will be discussed in further detail below, reducing the number of fingerprints stored in the index cache may reduce the amount of data written to the physical storage devices hosting the cache (130) and, thereby, may help to meet a predetermined goal of the cache hardware heuristics (132). For additional details regarding the index cache (131), See FIG. 1C.

The cache (132) may also include a cache hardware heuristics (132). The cache hardware heuristics (132) may include data regarding the usage of the physical storage devices hosting the cache (130). The cache hardware heuristics (132) may also include a goal for the usage of the physical storage devices hosting the cache (130).

While the cache hardware heuristics (132) are illustrated as being stored in the cache (130), the cache hardware heuristics (132) maybe stored in the data storage (120), in memory (not shown) of the data storage device (100), and/or on a storage of another computing device operably connected to the data storage device (100) without departing from the invention. For additional details regarding the cache hardware heuristics (132), See FIG. 1H.

The data storage device (100) may include a data deduplicator (140). The data deduplicator (140) may partially deduplicate segments of files before the segments are stored in the object storage (121). As discussed above, the segments may be partially deduplicated by comparing fingerprints of the segments of the to-be-stored file to a portions of the fingerprints stored in the index cache (131) and/or the index (122). In other words, the data deduplicator (140) may generate partially deduplicated segments, i.e., segments that have been deduplicated against a portion of the data stored in the object storage. Thus, the partially deduplicated segments still may include segments that are duplicates of segments stored in the object storage (121)

In one or more embodiments of the invention, the data deduplicator (140) may be a physical device. The physical device may include circuitry. The physical device may be, for example, a field-programmable gate array, application specific integrated circuit, programmable processor, microcontroller, digital signal processor, or other hardware processor. The physical device may be adapted to provide the functionality described throughout this application.

In one or more embodiments of the invention, the data deduplicator (140) may be implemented as computer instructions, e.g., computer code, stored on a persistent storage that when executed by a processor of the data storage device (100) cause the data storage device (100) to provide the functionality described throughout this application.

When deduplicating segments, the data deduplicator (140) compares the fingerprints of segments of to-be-stored files to the fingerprints of segments in the object storage (121). To improve the rate of the deduplication, the index cache (131) may be used to provide the fingerprints of the segments in the object storage (121) rather than the index (122).

The data storage device (100) may include a cache manager (141) that manages the contents of the index cache (131). More specifically, the cache manager (141) may reduce the number of fingerprints stored in the index cache to meet a predetermined cache hardware heuristics goal. The cache manager (141) may reduce the number of fingerprints in the index cache (131) by: (i) completely deduplicating the fingerprints of the partially deduplicated segments against all of the fingerprints of the index cache (131) and (ii) by not storing/removing fingerprints of segments of files that were stored in the object storage before a predetermined date in/from the index cache (131).

In one or more embodiments of the invention, the cache manager (141) may be a physical device. The physical device may include circuitry. The physical device may be, for example, a field-programmable gate array, application specific integrated circuit, programmable processor, microcontroller, digital signal processor, or other hardware processor. The physical device may be adapted to provide the functionality described throughout this application and the methods illustrated in FIGS. 3-7.

In one or more embodiments of the invention, the cache manager (141) may be implemented as computer instructions, e.g., computer code, stored on a persistent storage that when executed by a processor of the data storage device (100) cause the data storage device (100) to provide the functionality described throughout this application and the methods illustrated in FIGS. 3-7.

As discussed above, the index (122) and index cache (131) may be used to supply fingerprints to the data deduplicator (140) when segments of files are being deduplicated.

Figure 1B:
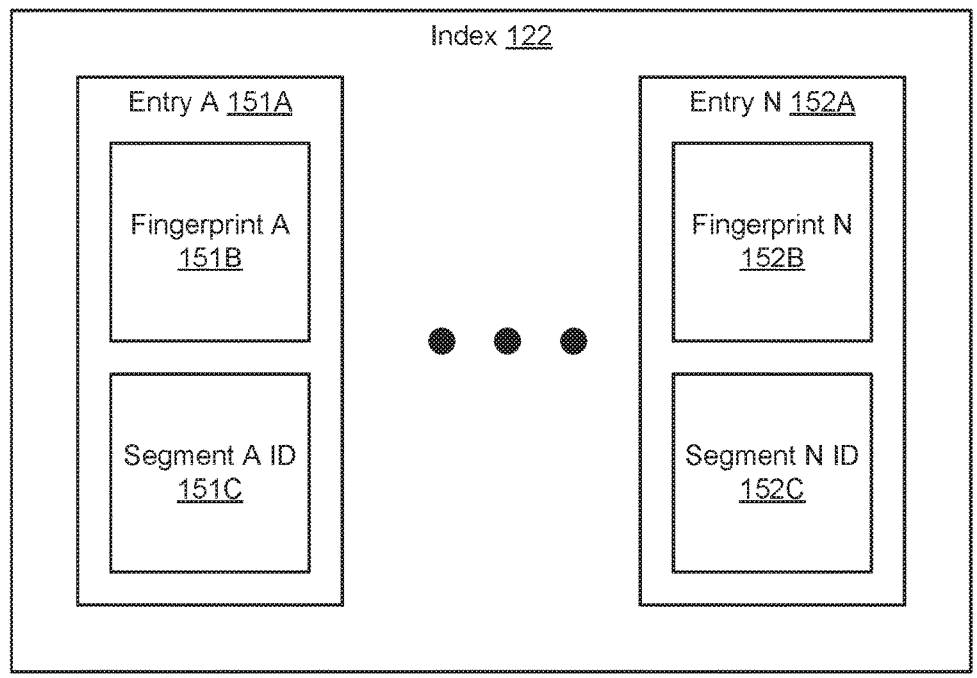
FIG. 1B shows a diagram of an index in accordance with one or more embodiments of the invention.

FIG. 1B shows a diagram of an index (122) in accordance with one or more embodiments of the invention. The index (122) includes entries (151A, 152A). Each of the entries may include a fingerprint (151B, 152B) and a segment ID (151C, 152C) of a segment used to generate the fingerprint of the entry.

Figure 1C:
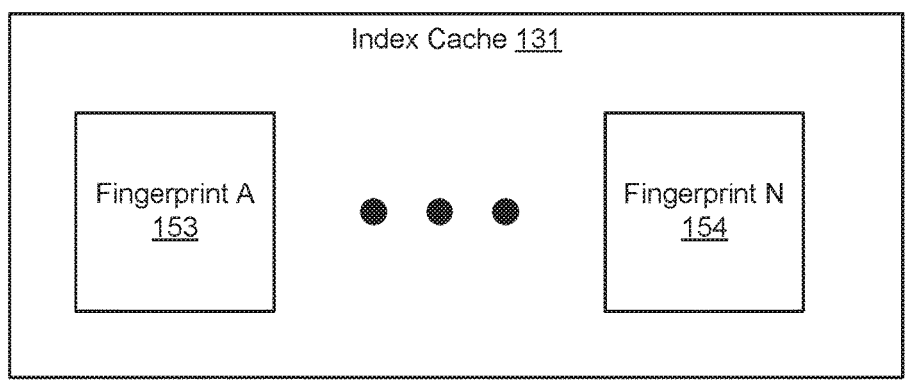
FIG. 1C shows a diagram of an index cache in accordance with one or more embodiments of the invention.

FIG. 1C shows a diagram of an index cache (131) in accordance with one or more embodiments of the invention. The index cache (131) includes a number of fingerprints (153, 154). The fingerprints (153, 154) of the index cache (131) may be selected/stored in the index cache (131) by the cache manager via the methods illustrated in FIGS. 3-7.

The index (122) and index cache (131) may include fingerprints of segments stored in the object storage (121, FIG. 1).

Figure 1D:
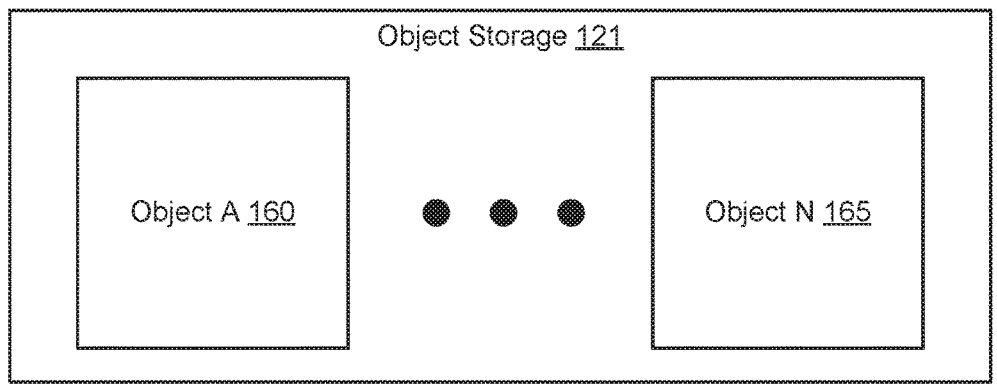
FIG. 1D shows a diagram of an object storage in accordance with one or more embodiments of the invention.

FIG. 1D shows a diagram of an object storage (121) in accordance with one or more embodiments of the invention. The object storage (121) include a number of objects (160, 165). Each of the objects may store a number of segments and meta-data regarding the segments stored in the respective object.

Figure 1E:
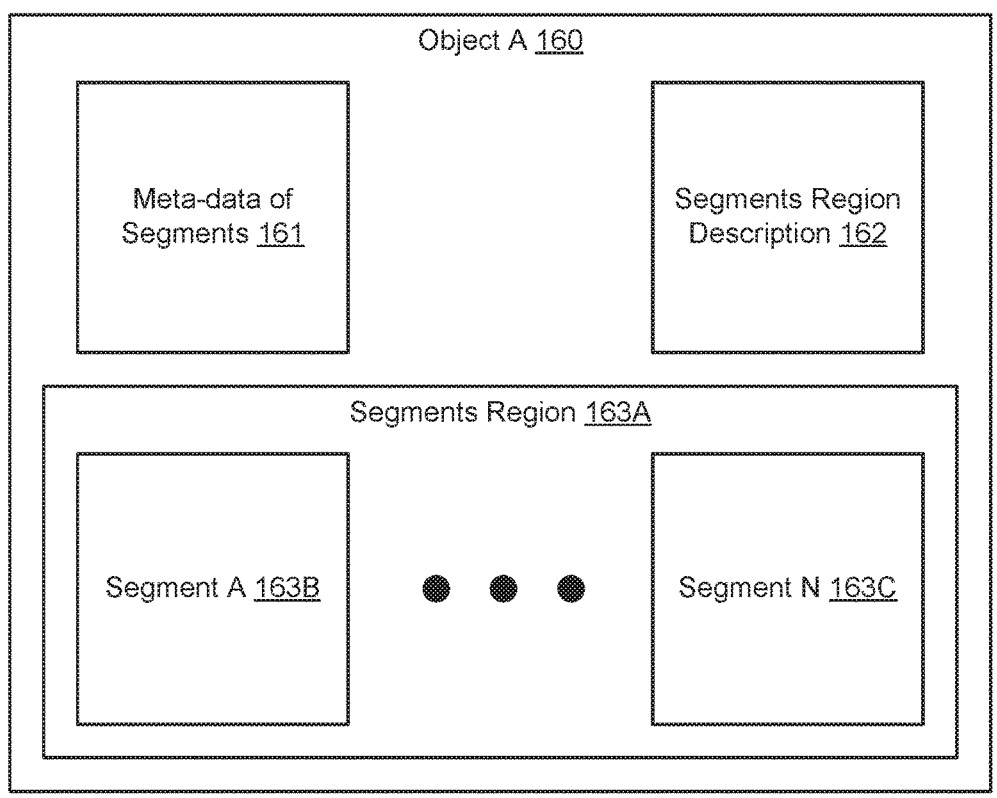
FIG. 1E shows a diagram of an object of the object storage in accordance with one or more embodiments of the invention.

FIG. 1E shows a diagram of an example of an object A (160) in accordance with one or more embodiments of the invention. Object A (160) includes meta-data of the segments (161) stored in object A (160) and a segments region description (162) that specifies a layout of a segments region (163A). The segments region (163A) includes a number of segments (163B, 163C). The segments region description (162) and meta-data of the segments (161) include information that enables object A (160) to be self descriptive, i.e., so that the segments (163B, 163C) can be read from the object using only the contents of the object without referencing other data structures.

The segments region description (162) may specify, for example, the start point of the segments region (163A) from the start of object A (160), the length of each segment (163B, 163C), and/or the end point of the segments region (163A). The segments region description (163) may include other/different data that enables the object to be self describing without departing from the invention.

The meta-data of segments (161) may include, for example, the fingerprint of each segment and/or the size of each segment in the segments region (163A). The mea-data of segments (161) may include other/different data without departing from the invention.

Returning to FIG. 1A, the data storage device may read a file stored in the object storage (121) by obtaining segments from the object storage (121) and generating the file using the obtained segments. The obtained files may be specified by a file recipe associated with the file stored in the object storage (121). To obtain the segments from the object storage (121), the data storage device (100) may identify objects of the object storage (121) that include each of the specified files using segment ID to object mappings (123).

Figure 1F:
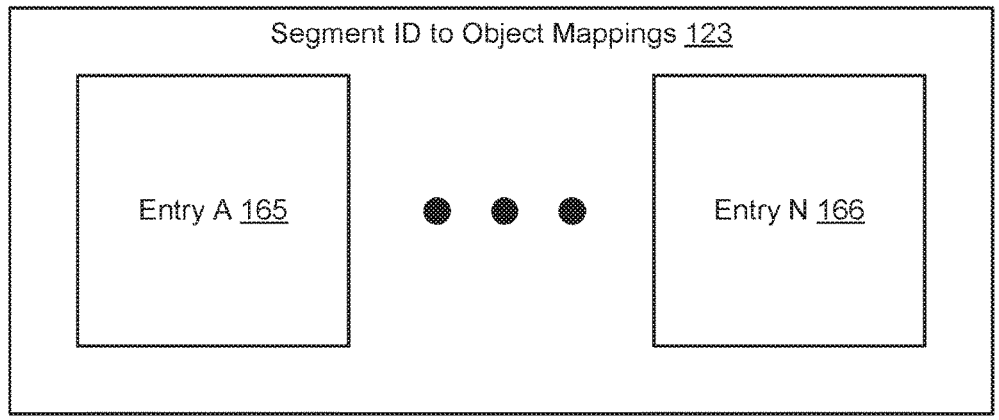
FIG. 1F shows a diagram of segment ID to Object mappings in accordance with one or more embodiments of the invention.

FIG. 1F shows a diagram of segment ID to object mappings (123). The segment ID to object mappings (123) include a number of entries (165, 166) that each associate a segment ID with an object ID.

Figure 1G:
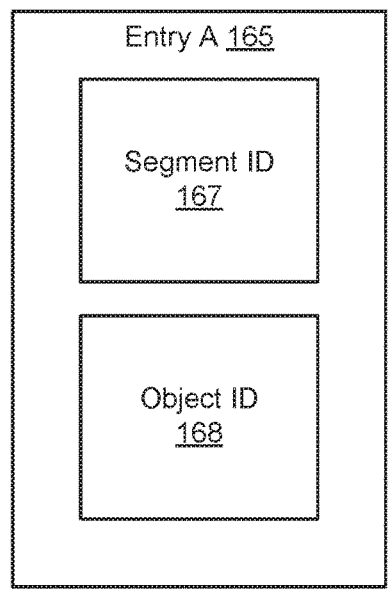
FIG. 1G shows a diagram of an entry of the segment ID to Object mappings in accordance with one or more embodiments of the invention.

FIG. 1G shows an example of an entry A (165) of the segment ID to object mappings (123). Entry A (165) includes a segment ID (167) and an object ID (168). Thus, each entry relates an identifier of a segment to an identifier of an object that includes the segment identified by the segment ID (167). The aforementioned mappings may be used to retrieve segments from the object storage. As discussed above, the object of the object storage may be self-describing and thereby enable a desired segment to be retrieved from the object once the object that includes the desired segment is identified.

Returning to FIG. 1A, the cache manager (141) may modify the size of the index cache (131) to meet one or more goals specified by the cache hardware heuristics (132) using historical usage data of the physical storage devices hosting the cache.

Figure 1H:
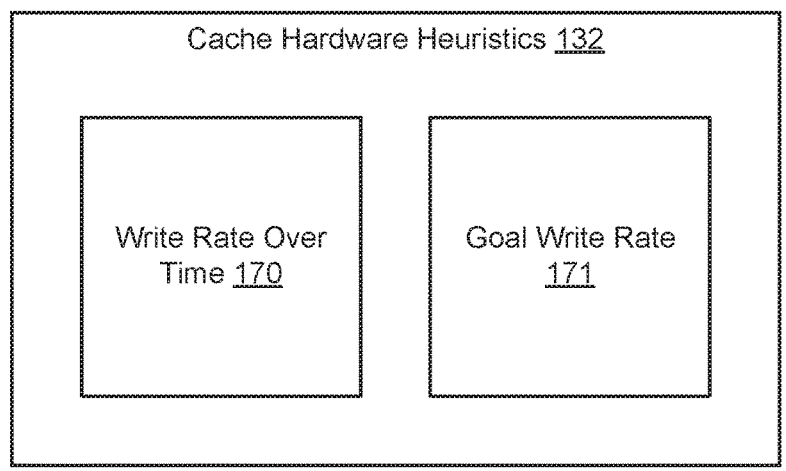
FIG. 1H shows a diagram of cache hardware heuristics in accordance with one or more embodiments of the invention.

FIG. 1H shows a diagram of cache hardware heuristics in accordance with one or more embodiments of the invention. The cache hardware heuristics may include write rates over time (170) and a goal write rate (171).

The write rates over time (170) may specify historical usage data of the physical storage devices hosting the cache. More specifically, the historical usage data may specify the quantity of data written to the physical storage devices hosting the cache on a daily basis. For example, the write rates over time (170) may specify that on a first day 100 gigabytes of data was written, on a second day 150 gigabytes of data was written, on a third day 120 gigabytes of data was written, etc.

The goal write rate (171) may specify a write rate goal. The goal may be an average write rate over a predetermined period of time. In one or more embodiments of the invention, the goal may be to write the total storage capacity of physical storage devices hosting the cache three times per day. In one or more embodiments of the invention, the goal may be to limit the average amount of data written to the physical storage devices hosting the cache based on a write limitation of the physical storage devices hosting the cache. The write limitation may be the average number of times the cells of the physical storage devices hosting the cache may be written before the cells stop working. The goal may be to ensure that the cells do not stop working before a predetermined time. The predetermined time may be, for example, three years, four years, five years, etc.

Figure 2A:
FIG. 2A shows a diagram of a file in accordance with one or more embodiments of the invention.
Figure 2B:
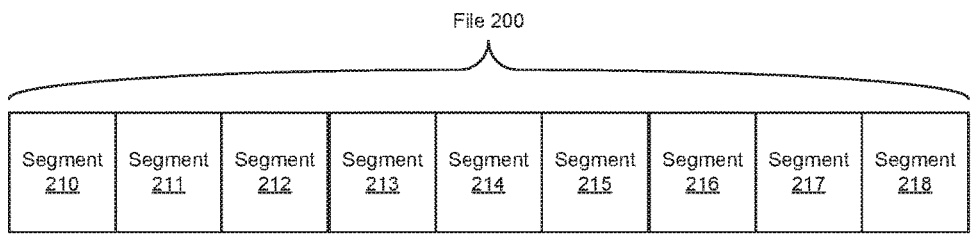
FIG. 2B shows a diagram of a relationship between segments of a file and the file in accordance with one or more embodiments of the invention.

As discussed above, when a file is sent to the data storage device for storage, the data management device may divide the file into segments. FIGS. 2A-2B show diagrams that illustrate relationships between a file (200) and segments (210-218) of the file (200).

FIG. 2A shows a diagram of a file (200) in accordance with one or more embodiments of the invention. The data may be any type of data in any format and of any length.

FIG. 2B shows a diagram of segments (210-218) of the file (200) of the data. Each segment may include separate, distinct portions of the file (200). Each of the segments may be of different, but similar lengths. For example, each segment may include approximately 8 kilobytes of data, e.g., a first segment may include 8.03 kilobytes of data, the second segment may include 7.96 kilobytes of data, etc. In one or more embodiments of the invention, the average amount of data of each segment is between 7.95 and 8.05 kilobytes.

FIGS. 3A-3F show flowcharts in accordance with one or more embodiments of the invention. The flowcharts illustrate methods that may be used to manage a cache of a data storage device. As discussed above, when data is stored in the object storage, it may be deduplicated using the index cache of the cache. The cache manager may dynamically modify the contents of the cache to meet cache hardware heuristics goals and thereby reduce the likelihood of failure of the physical devices that host the cache before a predetermine time.

Figure 3:
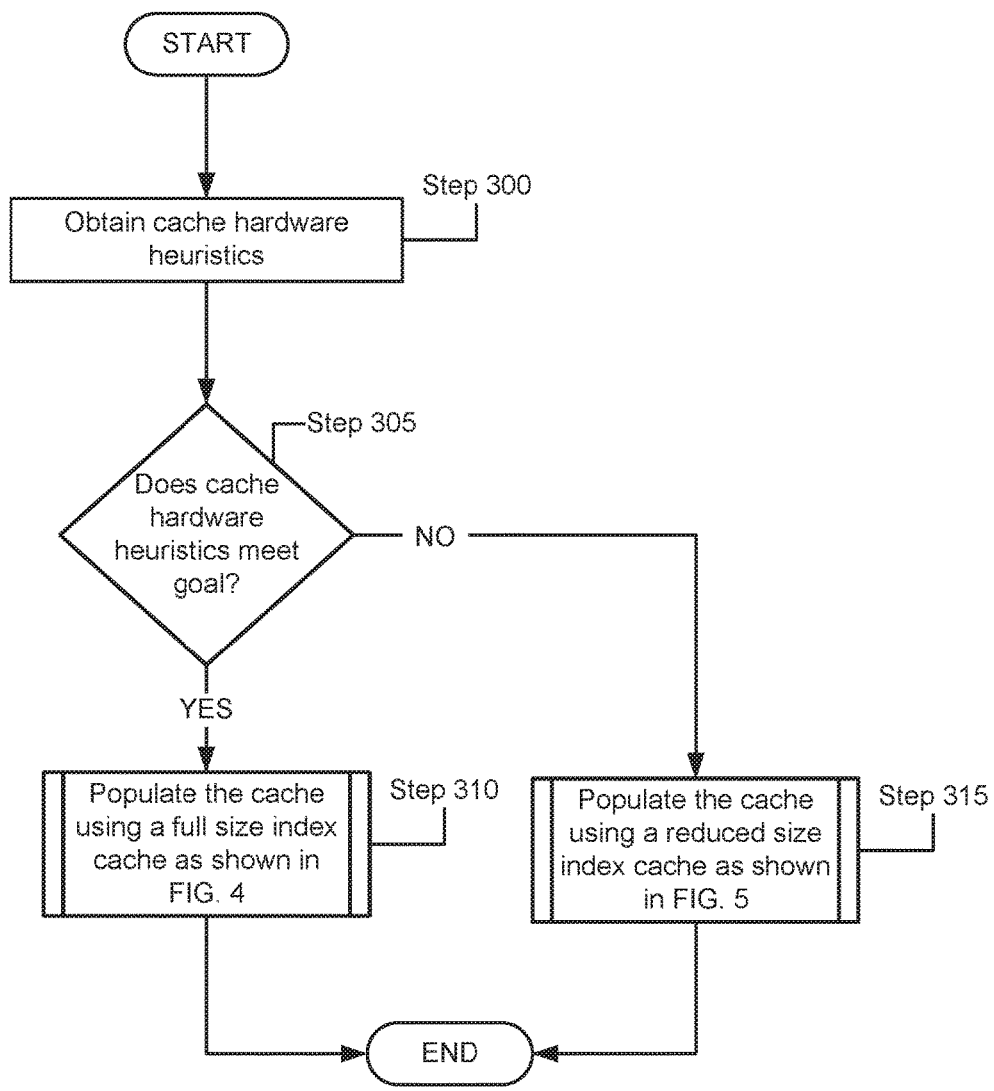
FIG. 3 shows a flowchart of a method of managing a cache in accordance with one or more embodiments of the invention.

FIG. 3 shows a flowchart of a method in accordance with one or more embodiments of the invention. The method depicted in FIG. 3 may be used to populate a cache in accordance with one or more embodiments of the invention. The method shown in FIG. 3 may be performed by, for example, a cache manager (141, FIG. 1A).

In Step 300, cache hardware heuristics are obtained.

In Step 305, it is determined whether the cache hardware heuristics meet a goal. More specifically, it may be determined whether the write rate over time of the physical devices hosting the cache meets a goal write rate. The goal write rate may be, for example, a quantity of data equal to three times the total quantity of storage space of the cache per day. If the cache hardware heuristics meets the goal, the method proceeds to Step 310. If the cache hardware heuristics do not meet the goal, the method proceeds to Step 315.

In Step 310, the cache is populated using a full size index cache. The cache may be populated using a full size index cache using the method shown in FIG. 4. The cache may be populated using a full size index cache using other methods without departing from the invention.

The method may end following Step 310.

Returning to Step 315, the cache is populated using a reduced size index cache. The cache may be populated using the reduced size index cache using the method shown in FIG. 5. The cache may be populated using the reduced size index cache using other methods without departing from the invention.

The method may end following Step 315.

The method shown in FIG. 3 may performed by the cache manager continuously or periodically. For example, the cache manager may perform the method shown in FIG. 3 once per day. In another example, the cache manager may continuously monitor the data write rate to the physical storage devices hosting the cache.

Figure 4:
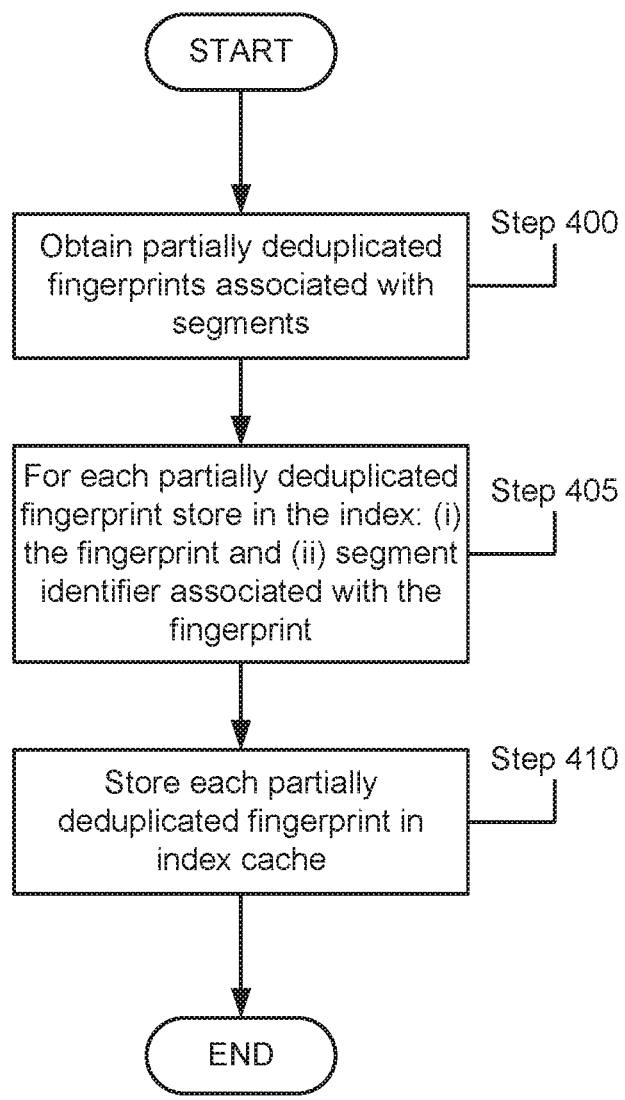
FIG. 4 shows a flowchart of a method of populating an index cache in accordance with one or more embodiments of the invention.

FIG. 4 shows a flowchart of a method in accordance with one or more embodiments of the invention. The method depicted in FIG. 4 may be used to populate a cache using a full size index cache in accordance with one or more embodiments of the invention. The method shown in FIG. 4 may be performed by, for example, a cache manager (141, FIG. 1A).

In Step 400, partially deduplicated fingerprints associated with segments of a file are obtained. The partially deduplicated fingerprints may be obtained from the data deduplicator (140).

In Step 405, a fingerprint and segment identifier associated with each fingerprint of the partially deduplicated fingerprints is stored in the index of the data storage.

In Step 410, each fingerprint of the partially deduplicated fingerprints is stored in the index cache of the cache.

The method may end following Step 410.

Figure 5:
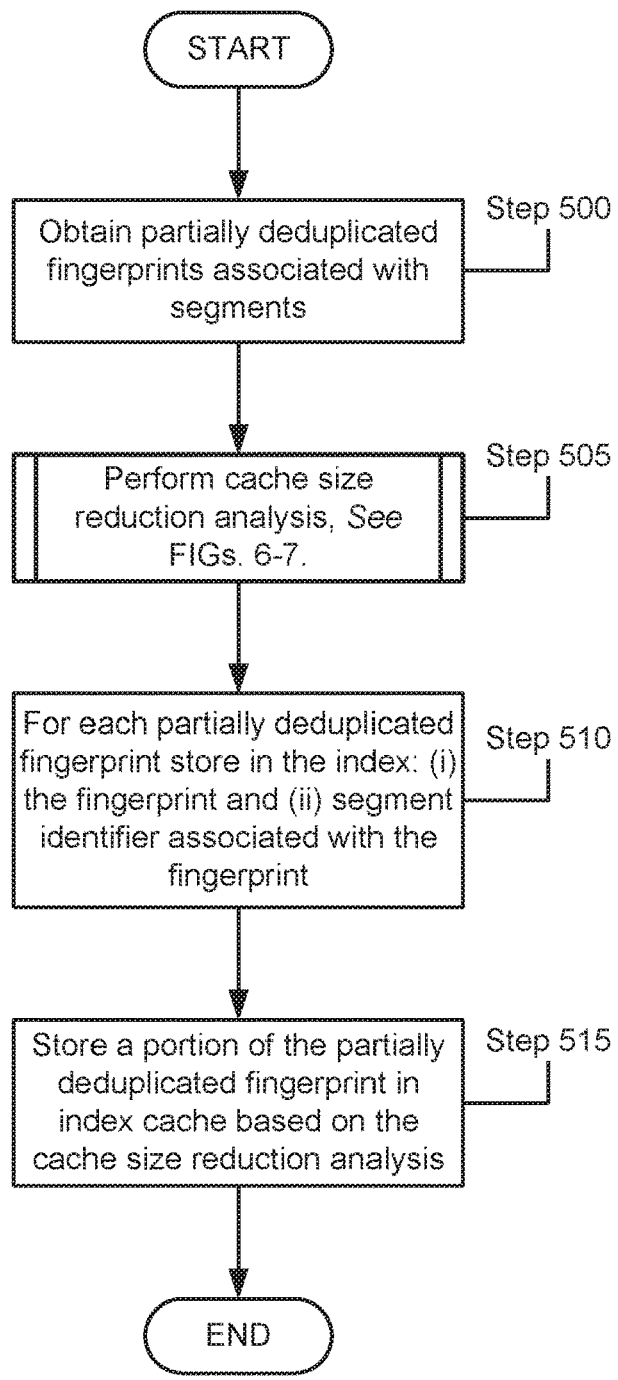
FIG. 5 shows a flowchart of a second method of populating an index cache in accordance with one or more embodiments of the invention.

FIG. 5 shows a flowchart of a method in accordance with one or more embodiments of the invention. The method depicted in FIG. 5 may be used to populate a cache using a reduced size index cache in accordance with one or more embodiments of the invention. The method shown in FIG. 5 may be performed by, for example, a cache manager (141, FIG. 1A).

In Step 500, partially deduplicated fingerprints associated with segments of a file are obtained. The partially deduplicated fingerprints may be obtained from the data deduplicator (140).

In Step 505, a cache size reduction analysis is performed. The cache size reduction analysis may identify a portion of the partially deduplicated fingerprints for storage in the index cache of the cache. The cache size reduction analysis may be performed using the method shown in FIGS. 6-7. The cache size reduction analysis may be performed using other methods without departing from the method.

In Step 510, a fingerprint and segment identifier associated with each fingerprint of the partially deduplicated fingerprints is stored in the index of the data storage.

In Step 515, a portion of the fingerprints of the partially deduplicated fingerprints is stored in the index cache of the cache is stored in the index cache. The portion of the fingerprints is based on the cache size reduction analysis. The cache size reduction analysis may select fingerprints of the partially deduplicated fingerprints that will not be stored in the index cache and thereby reduce the size of the index cache. Reducing the size of the index cache may reduce the amount of data written to the physical devices hosting the cache and thereby enable the data storage device to meet a goal.

The method may end following Step 515.

Figure 6:
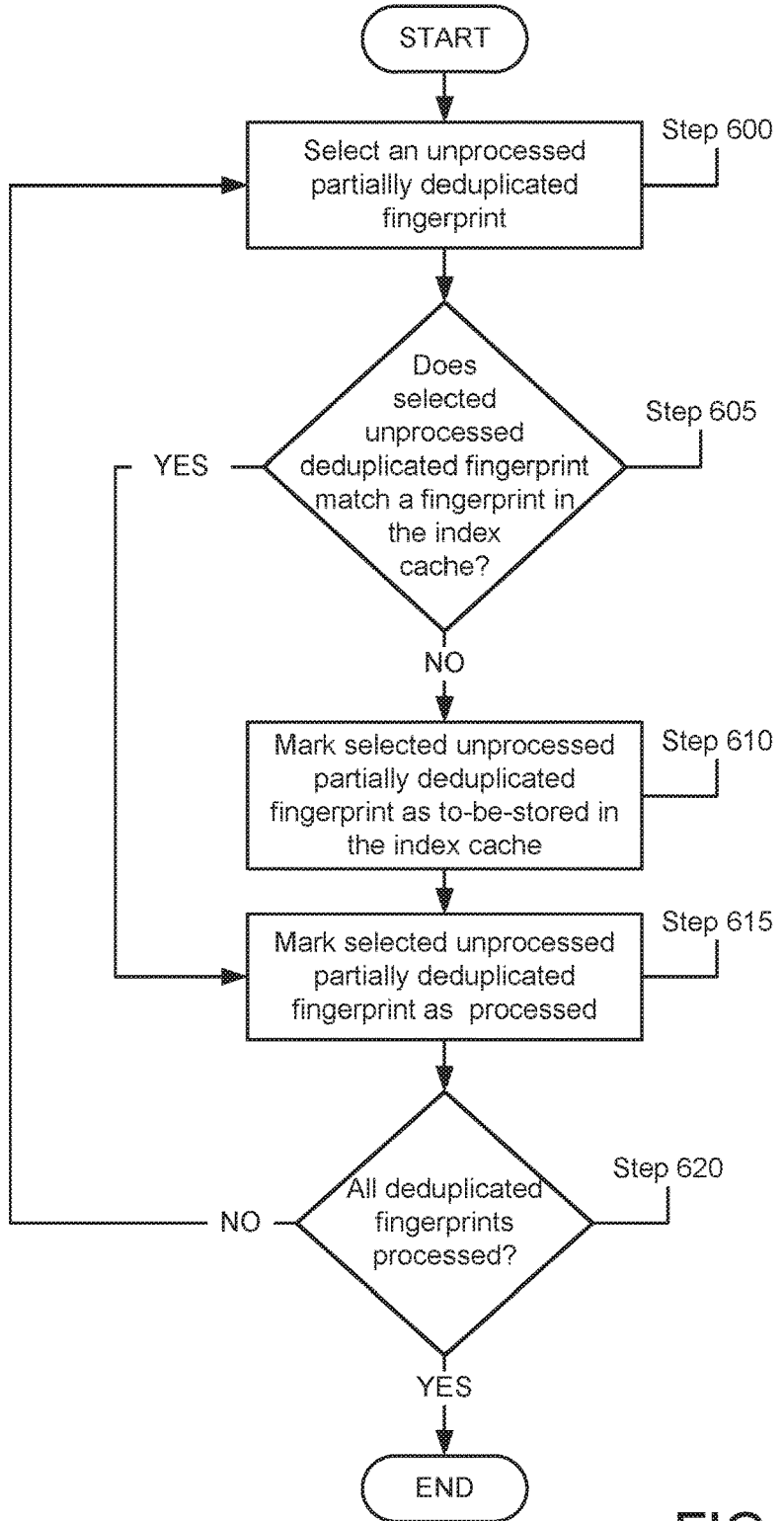
FIG. 6 shows a flowchart of a method of performing a cache size reduction analysis in accordance with one or more embodiments of the invention.

FIG. 6 shows a flowchart of a method in accordance with one or more embodiments of the invention. The method depicted in FIG. 6 may be used to select a portion of the deduplicated fingerprints for storage in the index cache in accordance with one or more embodiments of the invention. The method shown in FIG. 6 may be performed by, for example, a cache manager (141, FIG. 1A).

In Step 600, an unprocessed fingerprint of the partially deduplicated fingerprints is selected. At the start of the method shown in FIG. 6, all of the partially deduplicated fingerprints may be considered unprocessed.

In Step 605, it is determined whether the selected unprocessed fingerprint matches any fingerprint stored in the index cache. If the selected unprocessed fingerprint matches any fingerprint stored in the index cache, the method processed to Step 615. If the selected unprocessed fingerprint does not match any fingerprint stored in the index cache, the method processed to Step 610.

In Step 610, the selected unprocessed partially deduplicated fingerprint is marked as to-be-stored in the index cache.

In Step 615, the selected unprocessed fingerprint is marked as processed.

In Step 620, it is determined whether all of the partially deduplicated fingerprints have been processed. If all of the partially deduplicated fingerprints have been processed, the method may end following Step 620. If all of the partially deduplicated fingerprints have not been processed, the method may proceed to Step 600.

The method may end following Step 620.

As discussed with respect to Step 610, partially deduplicated fingerprints may be marked as to-be-stored as part of the step. The portion of the partially deduplicated fingerprints in Step 515 may be the partially deduplicated fingerprints marked as to be stored in Step 610.

Figure 7:
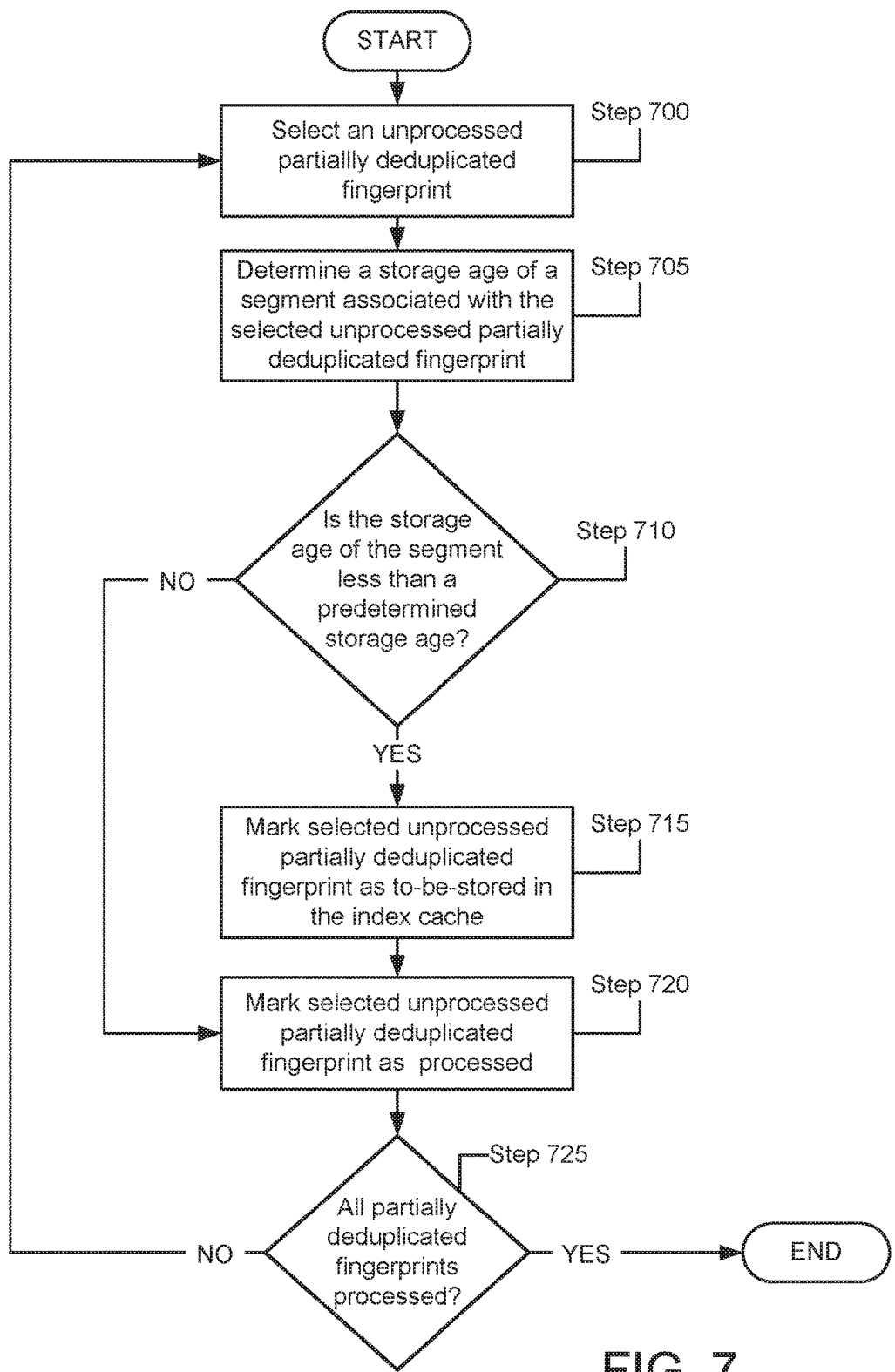
FIG. 7 shows a flowchart of a second method of performing a cache size reduction analysis in accordance with one or more embodiments of the invention.

FIG. 7 shows a flowchart of a method in accordance with one or more embodiments of the invention. The method depicted in FIG. 7 may be used to select a portion of the deduplicated fingerprints for storage in the index cache in accordance with one or more embodiments of the invention. The method shown in FIG. 7 may be performed by, for example, a cache manager (141, FIG. 1A).

In Step 700, an unprocessed fingerprint of the partially deduplicated fingerprints is selected. At the start of the method shown in FIG. 7, all of the partially deduplicated fingerprints may be considered unprocessed.

In one or more embodiments of the invention, the partially deduplicated fingerprints may include all of the fingerprints included in the index cache at the start of method shown in FIG. 7. Thus, the method illustrated in FIG. 7 may result in fingerprints already stored in the index cache being removed from the index cache, as will be discussed in greater detail below.

In Step 705, a storage age of the segment associated with the selected unprocessed partially deduplicated fingerprint is determined.

In one or more embodiments of the invention, the storage age may be determined based on an identifier of an object in which the segment is stored. In one or more embodiments of the invention, identifiers of objects may be numerical values that monotonically increase as each object is stored in the object storage. Thus, objects that are stored at earlier points in time may have lower object IDs while object that are stored t later points in time may have higher object IDs.

In Step 710, it is determined whether the storage age of the segment is less than a predetermined storage age.

As discussed above, the storage age may be the ID of the object in which the segment is stored. In one or more embodiments of the invention, the predetermined storage age is an ID of an object of the object storage. The ID of the object may an ID that results in a predetermined percentage of the object of the object storage having an ID that is less than the ID of the object. In one or more embodiments of the invention, the predetermined percentage may be 10%. In one or more embodiments of the invention, the predetermined percentage may be between 5% and 20%.

For example, if the object storage contains five objects having IDs of 1-5, respectively, a predetermined percentage of 20% may be selected. Based on the predetermined percentage, any segments stored in the first object, i.e., ID 1, will be determined as having a storage age greater than the predetermined storage age.

If the storage age of the segment is less than the predetermined storage age, the method proceeds to Step 715. If the storage age of the segment is not less than the predetermined storage age, the method proceeds to Step 720.

In Step 715, the selected unprocessed partially deduplicated fingerprint is marked as to-be-stored in the index cache.

In Step 720, the selected unprocessed partially deduplicated fingerprint is marked as processed.

In Step 725, it is determined whether all of the partially deduplicated fingerprints have been processed. If all of the partially deduplicated fingerprints have been processed, the method may end following Step 725. If all of the partially deduplicated fingerprints have not been processed, the method may proceed to Step 700.

While the methods illustrated in FIGS. 6 and 7 are illustrated as being separate processed, the methods could be performed in parallel or integrated into a single processes without departing from the invention.

In one or more embodiments of the invention, the methods illustrated in FIGS. 6 and 7 may be used as a first level and second level of cache size reduction analysis. In other words, the data storage device may only perform the method of FIG. 6 as part of the cache size reduction analysis when the cache hardware heuristics do not meet a goal by a first percentage.

For example, when the data write rate to the physical storage devices hosting the cache differs from the goal by between 1% and 20%, the data storage device may only perform the method shown in FIG. 6 as part of the cache size reduction analysis. When the data write rate to the physical storage devices hosting the cache differs from the goal by more than 20%, the data storage device may perform both of the method shown in FIGS. 6 and 7 as part of the cache size reduction analysis. In one or more embodiments of the invention, the transition point from where the data storage device changes the cache size reduction analysis from only performing the method in FIG. 6 to the method shown in FIG. 7 may be a difference from the goal of between 10 and 200%. In one or more embodiments of the invention, the transition point from where the data storage device changes the cache size reduction analysis from only performing the method in FIG. 6 to the method shown in FIG. 7 may be a difference from the goal of 50% of the value of the goal. In one or more embodiments of the invention, the transition point from where the data storage device changes the cache size reduction analysis from only performing the method in FIG. 6 to the method shown in FIG. 7 may be a difference from the goal of 100% of the value of the goal.

To further clarify embodiments of the invention, FIGS. 8A-8K shows diagrams an example. The example is included for explanatory purposes and is not limiting.

Example 1

Figure 8A:
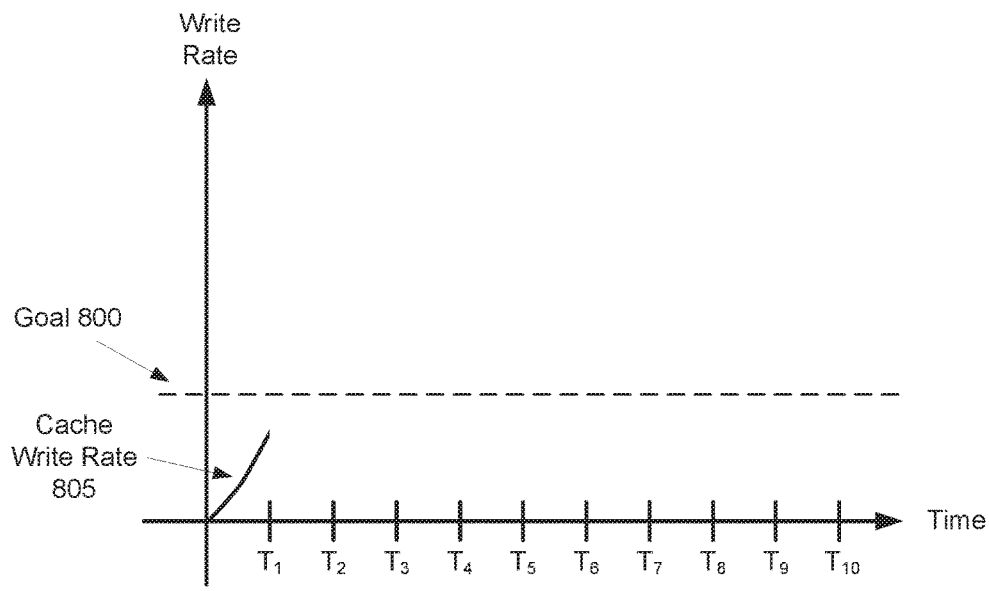
FIG. 8A shows a first diagram of an explanatory example.

FIG. 8A shows a diagram of a plot of the amount of data written to physical devices hosting a cache of a data storage device. In the plot, the horizontal axis represents time and the vertical axis represents the write rate to the physical storage devices.

The data storage device has a goal (800) that specifies the average amount of data to be written to the physical storage devices hosting the cache. During the first time period, indicated by the portion of the plot to the left of time $T_1$, the data storage device is turned on and start storing data. As part of the data storage process, the data is deduplicated.

To facilitate deduplication, the cache manager continuously updates the index cache as indicated by the rising cache write rate. In other words, as the cache is populated throughout the period, the cache manager writes all of the fingerprints of the deduplicated segments of the data to the index cache.

Figure 8B:
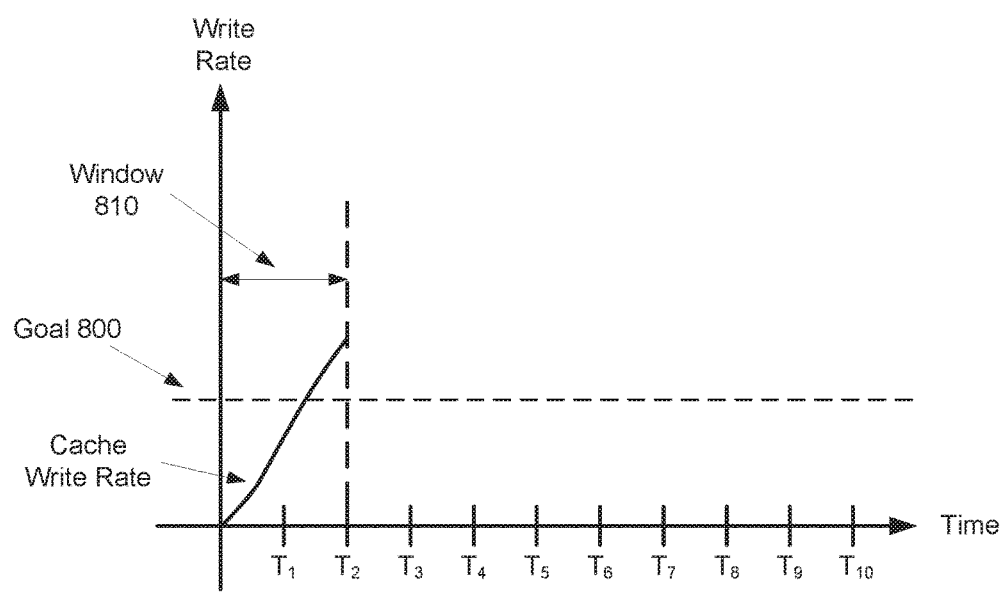
FIG. 8B shows a first diagram of an explanatory example.

During the second period of time, indicated by the portion of the plot between $T_1$ and $T_2$, the cache manager continues to update the cache as shown in FIG. 8B. More specifically, as the cache becomes larger, the amount of data written to the physical storage devices hosted by the cache continues to increase. Thus, the write rate to the right of time $T_1$ is greater than the write rate to the left of time $T_1$.

At time $T_2$, the cache manager evaluates whether to continue to populate the cache using a full size index cache or a reduced size index cache. To do so, the cache manager calculates the average rate data is written to the physical storage devices hosting the cache for a given window (810). In this case, the window is selected to be two time periods, e.g., the area along the horizontal axis to the left of time $T_1$.

As seen from row 2 of FIG. 8K, the average rate that data is written to the physical storage device hosting the cache during the period of time from $T_0$ to $T_2$ is still less than the goal write rate. Accordingly, during the next period of time, i.e., $T_2$-$T_3$, the cache manager continues to populate the index cache using a full size index cache.

Figure 8C:
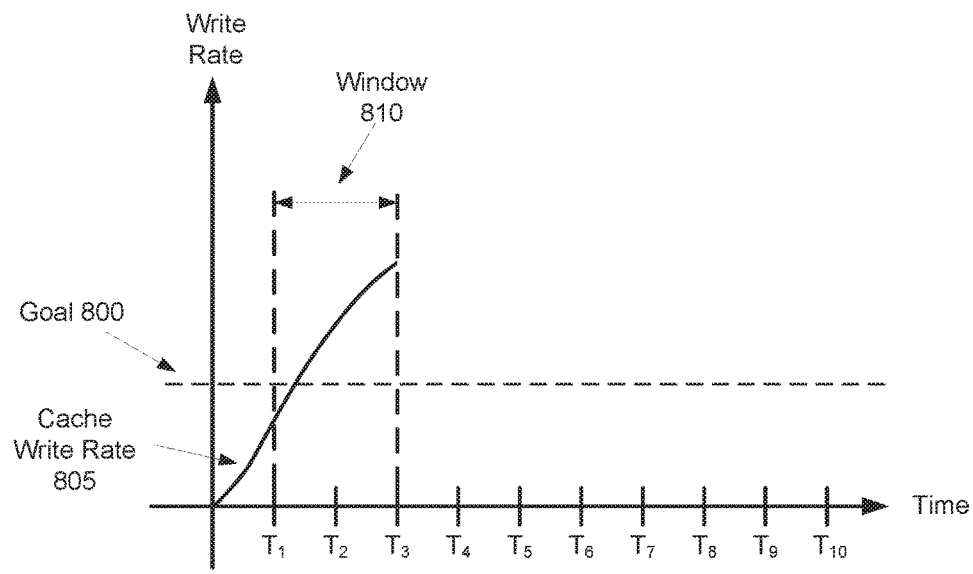
FIG. 8C shows a first diagram of an explanatory example.

Moving to FIG. 8C, at time $T_3$ the cache manager evaluates whether to continue to populate the cache using a full size index cache or a reduced size index cache. To do so, the cache manager calculates the average rate data is written to the physical storage devices hosting the cache for the window (810) period of $T_1$ to $T_3$ based on the previously set window period of two time periods.

As seen from row 3 of FIG. 8K, the average rate that data is written to the physical storage device hosting the cache during the period of time from $T_1$ to $T_3$ is greater than the goal write rate. Accordingly, during the next period of time, i.e., $T_3$-$T_4$, the cache manager populates the index cache using a reduced size index cache rather than a full size index cache.

Figure 8D:
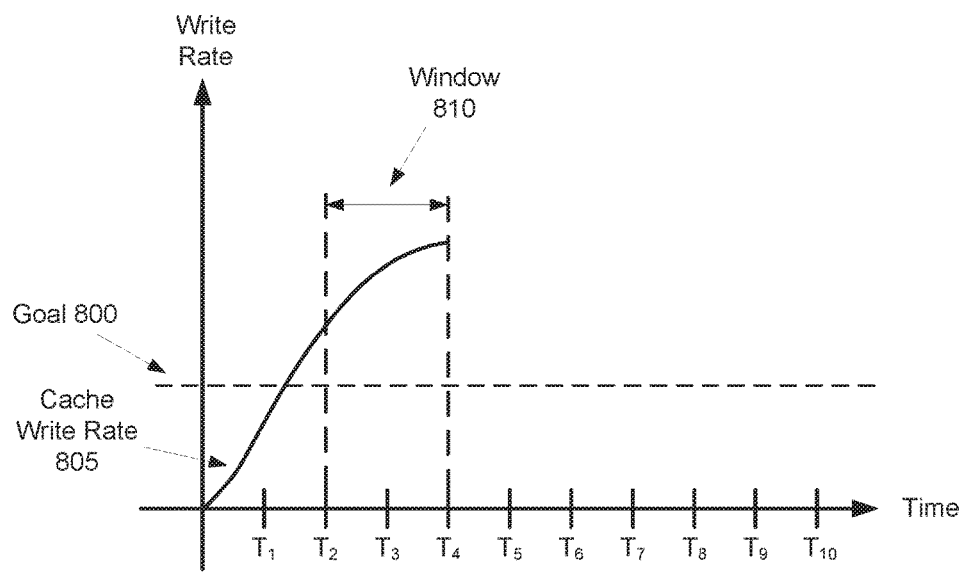
FIG. 8D shows a first diagram of an explanatory example.

Moving to FIG. 8D, at time $T_4$ the cache manager evaluates whether to continue to populate the cache using a full size index cache or a reduced size index cache. To do so, the cache manager calculates the average rate data is written to the physical storage devices hosting the cache for the window (810) period of $T_2$ to $T_4$ based on the previously set window period of two time periods.

As seen from row 4 of FIG. 8K, the average rate that data is written to the physical storage device hosting the cache during the period of time from $T_2$ to $T_4$ is still greater than the goal write rate (805). Accordingly, during the next period of time, i.e., $T_4$-$T_5$, the cache manager continues to populate the index cache using a reduced size index cache rather than a full size index cache.

Figure 8E:
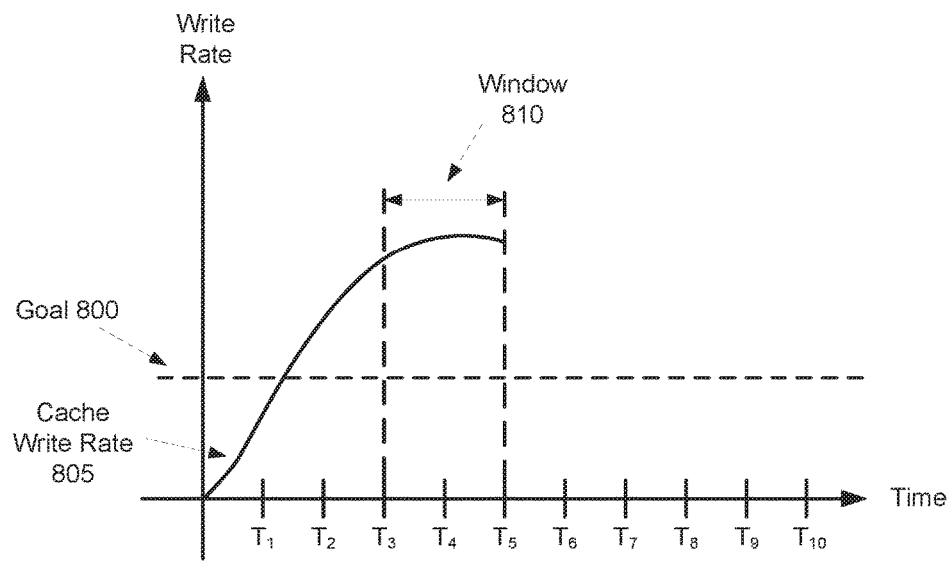
FIG. 8E shows a first diagram of an explanatory example.

Moving to FIG. 8E, at time $T_5$ the cache manager evaluates whether to continue to populate the cache using a full size index cache or a reduced size index cache. To do so, the cache manager calculates the average rate data is written to the physical storage devices hosting the cache for the window (810) period of $T_3$ to $T_5$ based on the previously set window period of two time periods.

As seen from row 5 of FIG. 8K, the average rate that data is written to the physical storage device hosting the cache during the period of time from $T_3$ to $T_5$ is still greater than the goal write rate (805). Accordingly, during the next period of time, i.e., $T_5$-$T_6$, the cache manager continues to populate the index cache using a reduced size index cache rather than a full size index cache.

Figure 8F:
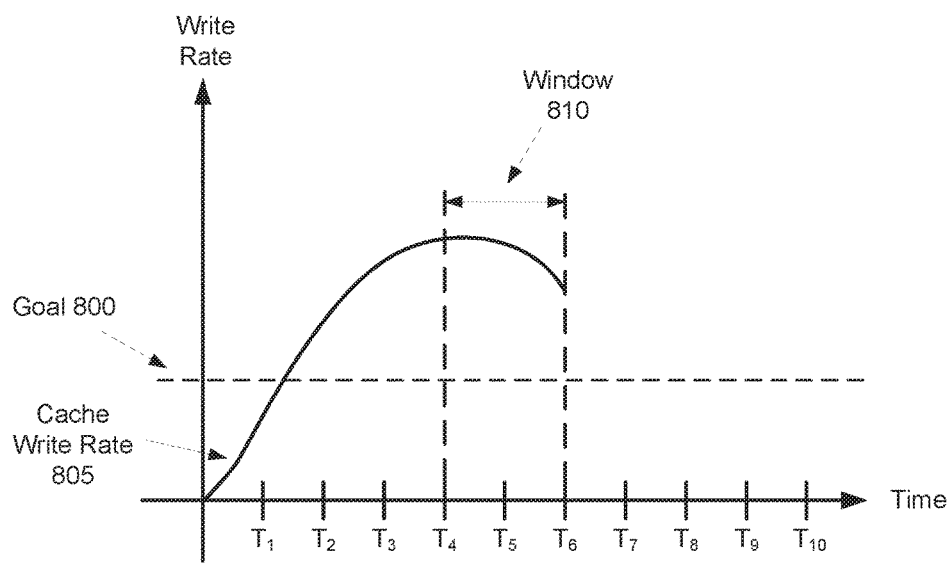
FIG. 8F shows a first diagram of an explanatory example.

Moving to FIG. 8F, at time $T_6$ the cache manager evaluates whether to continue to populate the cache using a full size index cache or a reduced size index cache. To do so, the cache manager calculates the average rate data is written to the physical storage devices hosting the cache for the window (810) period of $T_4$ to $T_6$ based on the previously set window period of two time periods.

As seen from row 6 of FIG. 8K, the average rate that data is written to the physical storage device hosting the cache during the period of time from $T_4$ to $T_6$ is still greater than the goal write rate (805). Accordingly, during the next period of time, i.e., $T_6$-$T_7$, the cache manager continues to populate the index cache using a reduced size index cache rather than a full size index cache.

Figure 8G:
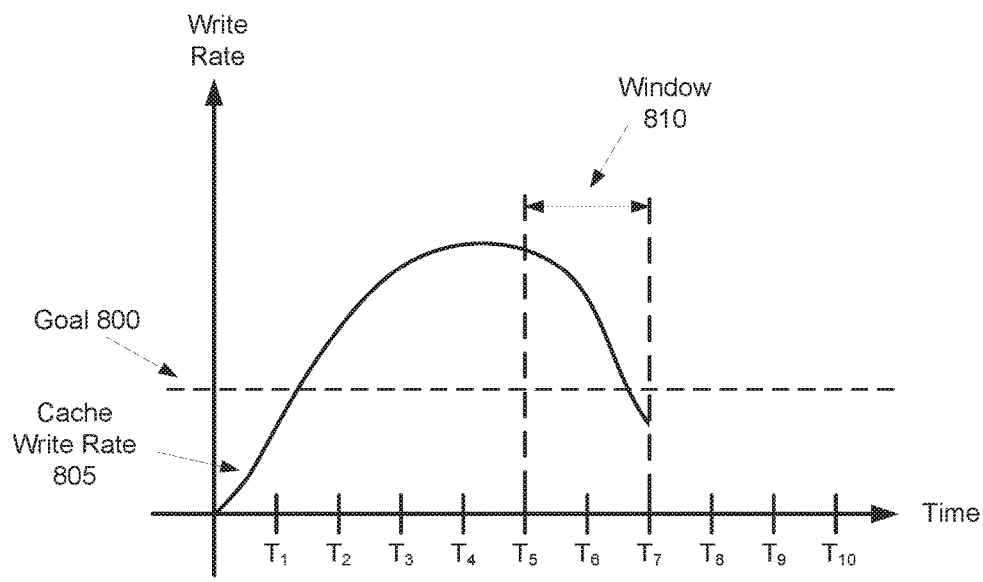
FIG. 8G shows a first diagram of an explanatory example.

Moving to FIG. 8G, at time $T_7$ the cache manager evaluates whether to continue to populate the cache using a full size index cache or a reduced size index cache. To do so, the cache manager calculates the average rate that data is written to the physical storage devices hosting the cache for the window (810) period of $T_5$ to $T_7$ based on the previously set window period of two time periods.

As seen from row 7 of FIG. 8K, the average rate that data is written to the physical storage device hosting the cache during the period of time from $T_5$ to $T_7$ is still greater than the goal write rate (805). Accordingly, during the next period of time, i.e., $T_7$-$T_8$, the cache manager continues to populate the index cache using a reduced size index cache rather than a full size index cache.

Figure 8H:
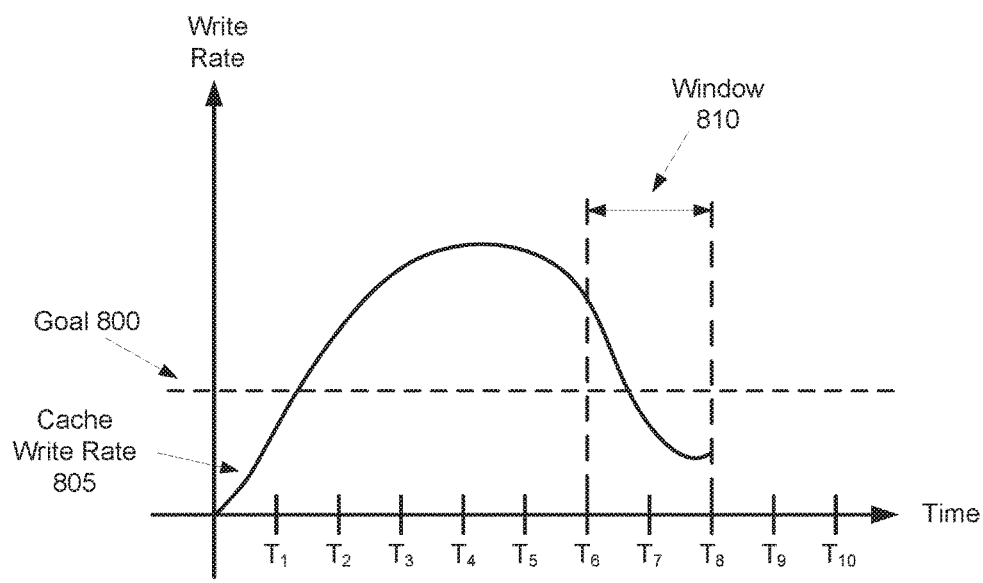
FIG. 8H shows a first diagram of an explanatory example.

Moving to FIG. 8H, at time $T_8$ the cache manager evaluates whether to continue to populate the cache using a full size index cache or a reduced size index cache. To do so, the cache manager calculates the average rate that data is written to the physical storage devices hosting the cache for the window (810) period of $T_6$ to $T_8$ based on the previously set window period of two time periods.

As seen from row 8 of FIG. 8K, the average rate that data is written to the physical storage device hosting the cache during the period of time from $T_6$ to $T_8$ is less than the goal write rate (805). Accordingly, during the next period of time, i.e., $T_8$-$T_9$, the cache manager populates the index cache using a full size index cache rather than a reduced size index cache.

Figure 8I:
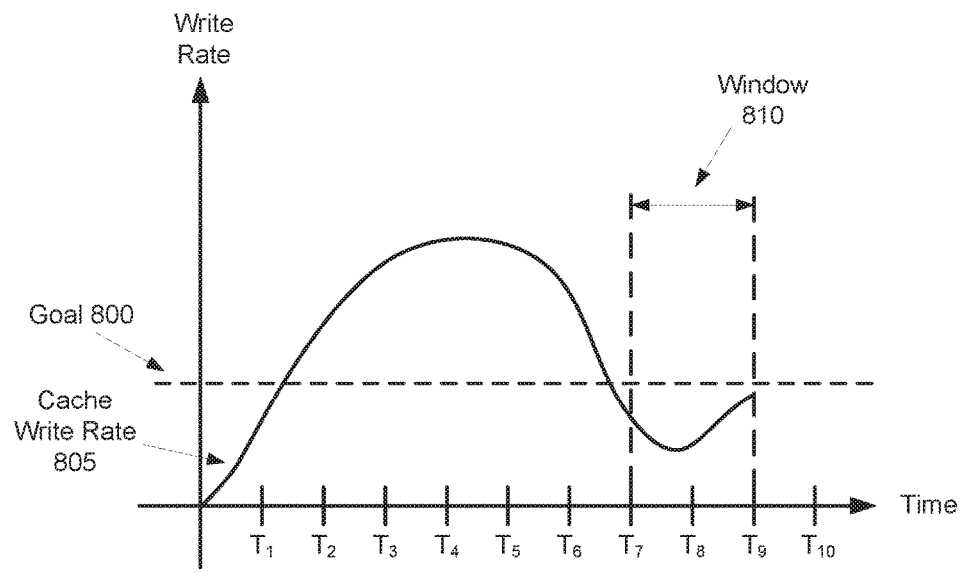
FIG. 8I shows a first diagram of an explanatory example.

Moving to FIG. 8I, at time $T_9$ the cache manager evaluates whether to continue to populate the cache using a full size index cache or a reduced size index cache. To do so, the cache manager calculates the average rate that data is written to the physical storage devices hosting the cache for the window (810) period of $T_7$ to $T_9$ based on the previously set window period of two time periods.

As seen from row 9 of FIG. 8K, the average rate that data is written to the physical storage device hosting the cache during the period of time from $T_7$ to $T_9$ is still less than the goal write rate (805). Accordingly, during the next period of time, i.e., $T_9$-$T_{10}$, the cache manager continues to populate the index cache using a full size index cache rather than a reduced size index cache.

Figure 8J:
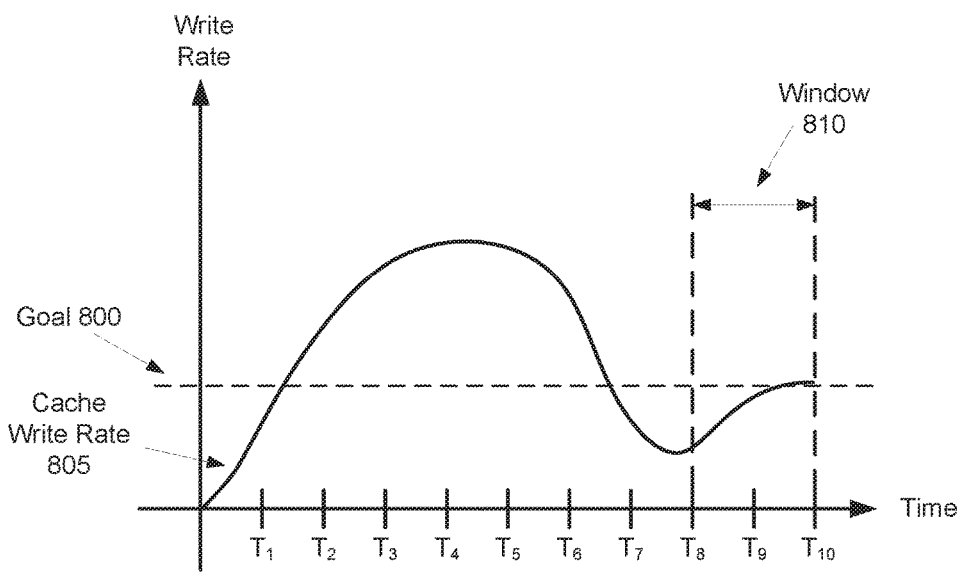
FIG. 8J shows a first diagram of an explanatory example.

Moving to FIG. 8J, at time $T_{10}$ the cache manager evaluates whether to continue to populate the cache using a full size index cache or a reduced size index cache. To do so, the cache manager calculates the average rate that data is written to the physical storage devices hosting the cache for the window (810) period of $T_8$ to $T_{10}$ based on the previously set window period of two time periods.

As seen from row 10 of FIG. 8K, the average rate that data is written to the physical storage device hosting the cache during the period of time from $T_8$ to $T_{10}$ is still less than the goal write rate (805). Accordingly, during the next period of time, i.e., $T_{10}$ onward, the cache manager continues to populate the index cache using a full size index cache rather than a reduced size index cache.

The Example ends following time $T_{10}$.

One or more embodiments of the invention may be implemented using instructions executed by one or more processors in the data storage device. Further, such instructions may correspond to computer readable instructions that are stored on one or more non-transitory computer readable mediums.

One or more embodiments of the invention may enable one or more of the following: i) improve the operational lifetime of physical storage devices hosting a cache, ii) reduce the quantity of data stored in an index cache without causing cache misses due to the reduced amount of data stored in the index cache, and iii) reduce computational cost of performing deduplication of file segments by reducing the number of fingerprints which the segments are deduplicated against.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A data storage device, comprising:
a cache for a data storage comprising an object storage;
a processor programmed to:
obtain cache hardware heuristics data for a first time period;
make a first determination that the cache hardware heuristics data for the first time period does not meet a goal associated with the first time period;
in response to the first determination:
obtain a plurality of fingerprints;
identify a plurality of segments associated with the plurality of fingerprints;
identify a storage date of each segment of the plurality of segments;
select a portion of the plurality of fingerprints based on the storage date of each segment of the plurality of segments; and
populate the cache using the portion of the plurality of fingerprints during a second time period.

2. The data storage device of claim 1, wherein the processor is further programmed to:
obtain cache hardware heuristics data for the second time period;
make a second determination that the cache hardware heuristics data for the second time period meets a goal associated with the second time period; and
populate the cache using a full size index cache in response to the second determination during a third time period,
wherein the full size index cache is larger than the reduced size index cache.

3. The data storage device of claim 1, wherein determining the storage date of each segment of the plurality of segments comprises:
identifying a first object of the object storage that stores a first fingerprint of the plurality of fingerprints;
identifying a second object of the object storage that stores a first fingerprint of the plurality of fingerprints;
making a second determination that an object identifier of the first object is less than an object identifier of the second object; and
in response to the second determination, including the first fingerprint in the portion of the plurality of fingerprints.

4. The data storage device of claim 1, wherein determining the storage date of each segment of the plurality of segments comprises:
identifying a first object of the object storage that stores a first fingerprint of the plurality of fingerprints;
identifying a second object of the object storage that stores a first fingerprint of the plurality of fingerprints;
making a second determination that an object identifier of the first object is greater than an object identifier of the second object; and
in response to the second determination, including the second fingerprint in the portion of the plurality of fingerprints.

5. The data storage device of claim 1, wherein the cache hardware heuristics data indicates a quantity of data written to a persistent storage each day.

6. The data storage device of claim 1, wherein the goal associated with the first time period specifies a quantity of data written to a persistent storage each day averaged over a window period.

7. The data storage device of claim 6, wherein the window period is between 15 days and 45 days.

8. A method of operating a data storage device, comprising:
- obtaining, by the data storage device, cache hardware heuristics data for a first time period, wherein the cache hardware heuristics data is associated with a cache for an object storage;
- making, by the data storage device, a first determination that the cache hardware heuristics data for the first time period does not meet a goal associated with the first time period;
- in response to the first determination and by the data storage device:
  - obtaining a plurality of fingerprints;
  - identifying a plurality of segments associated with the plurality of fingerprints;
  - identifying a storage date of each segment of the plurality of segments;
  - selecting a portion of the plurality of fingerprints based on the storage date of each segment of the plurality of segments; and
  - populating the cache using the portion of the plurality of fingerprints during a second time.

9. The method of claim 8, further comprising:
- obtaining, by the data storage device, cache hardware heuristics data for the second time period;
- making, by the data storage device, a second determination that the cache hardware heuristics data for the second time period meets a goal associated with the second time period; and
- populating, by the data storage device, the cache using a full size index cache in response to the second determination during a third time period,
- wherein the full size index cache is larger than the reduced size index cache.

10. A non-transitory computer readable medium comprising computer readable program code, which when executed by a computer processor enables the computer processor to perform a method for operating a data storage device, the method comprising:
- obtaining, by the data storage device, cache hardware heuristics data for a first time period, wherein the cache hardware heuristics data is associated with a cache for an object storage;
- making, by the data storage device, a first determination that the cache hardware heuristics data for the first time period does not meet a goal associated with the first time period;
- in response to the first determination and by the data storage device:
  - obtaining a plurality of fingerprints;
  - identifying a plurality of segments associated with the plurality of fingerprints;
  - identifying a storage date of each segment of the plurality of segments;
  - selecting a portion of the plurality of fingerprints based on the storage date of each segment of the plurality of segments; and
  - populating the cache using the portion of the plurality of finger prints during a second time.

11. The non-transitory computer readable medium of claim 10, wherein the method further comprises:
- obtaining, by the data storage device, cache hardware heuristics data for the second time period;
- making, by the data storage device, a second determination that the cache hardware heuristics data for the second time period meets a goal associated with the second time period; and
- populating, by the data storage device, the cache using a full size index cache in response to the second determination during a third time period,
- wherein the full size index cache is larger than the reduced size index cache.

\* \* \* \* \*